(12) United States Patent
Dalal et al.

(10) Patent No.: US 7,606,159 B2
(45) Date of Patent: Oct. 20, 2009

(54) METHOD AND APPARATUS FOR UPDATING BEST PATH BASED ON REAL-TIME CONGESTION FEEDBACK

(75) Inventors: Mitesh Dalal, Santa Clara, CA (US);
Pritam Shah, Brookline, MA (US);
Amol Khare, Sunnyvale, CA (US);
Vamsidhar Valluri, Fremont, CA (US)

(73) Assignee: Cisco Technology, Inc., San Jose, CA (US)

( * ) Notice: Subject to any disclaimer, the term of this patent is extended or adjusted under 35 U.S.C. 154(b) by 595 days.

(21) Appl. No.: 11/216,589

(22) Filed: Aug. 30, 2005

(65) Prior Publication Data
US 2007/0047446 A1    Mar. 1, 2007

(51) Int. Cl.
*H04L 12/28* (2006.01)
(52) U.S. Cl. .................................................... 370/237
(58) Field of Classification Search .................. 370/231, 370/236.2, 399, 216–218, 229–232, 235, 370/235.1, 236, 237, 238.1, 241, 241.1, 398–395.32, 370/395.52
See application file for complete search history.

(56) References Cited

U.S. PATENT DOCUMENTS

| | | | |
|---|---|---|---|
| 5,426,640 A | 6/1995 | Hluchyj et al. | |
| 6,483,805 B1 | 11/2002 | Davies et al. | |
| 6,532,214 B1 | 3/2003 | Rumsewicz | |
| 6,567,380 B1 * | 5/2003 | Chen | 370/238 |
| 6,636,487 B1 | 10/2003 | Roy | |
| 6,744,768 B2 * | 6/2004 | Vikberg et al. | 370/395.21 |
| 7,046,665 B1 * | 5/2006 | Walrand et al. | 370/392 |
| 2005/0135254 A1 * | 6/2005 | Taylor et al. | 370/237 |
| 2006/0221876 A1 * | 10/2006 | Kosanovic et al. | 370/286 |

OTHER PUBLICATIONS

Claims, PCT/US2006/32828, 9 pages.
International Searching Authority, "International Search Report", PCT/US2006/32828, dated Jul. 14, 2008, 7 pages.

* cited by examiner

*Primary Examiner*—Kwang B Yao
*Assistant Examiner*—Alex Skripnikov
(74) *Attorney, Agent, or Firm*—Hickman Palermo Truong & Becker LLP (57) ABSTRACT

Techniques are provided for updating best path based on real-time congestion feedback. A method comprises monitoring packets received from an internetworked system, wherein the packets are received on one of a plurality of external interfaces of a networking device; detecting that a received packet includes real-time information that signals a present or pending congestion condition on a path from the external interfaces of the networking device to the internetworked system; notifying a control logic of the real-time information; receiving from the control logic control information defining a change in one or more paths from the external interfaces to the internetworked system; and changing the one or more paths from the external interfaces to the internetworked system. Examining ingress traffic on external interfaces of an internetworked system can cause changes to routes, routing policies and PBRs in routers of the first internetworked system in response to real-time congestion.

26 Claims, 9 Drawing Sheets

METHOD AND APPARATUS FOR UPDATING BEST PATH BASED ON REAL-TIME CONGESTION FEEDBACK

FIELD OF THE INVENTION

The present invention generally relates to the field of internetworking. The invention relates more specifically to approaches for updating a best path as determined by a routing protocol in response to congestion.

BACKGROUND OF THE INVENTION

The approaches described in this section could be pursued, but are not necessarily approaches that have been previously conceived or pursued. Therefore, unless otherwise indicated herein, the approaches described in this section are not prior art to the claims in this application and are not admitted to be prior art by inclusion in this section.

In internetworks such as the public Internet, to send a packet from one endpoint host to another, the sending host only needs to place an internet protocol (IP) address owned by the other host into the packet and relies on a network of elements such as routers, switches, bridges and hubs for actual delivery. An IP address can share a prefix that is assigned by a service provider, or provisioned by an organization owning the site of which the host is a part, or directly obtained from American Registry for Internet Numbers (ARIN). A prefix essentially is a subspace within the space of all possible IP addresses, and may encompass one or more local area networks (LANs).

The process of physically moving packets by routers, switches, bridges and hubs from a source to a destination is called forwarding. Typically, switches, bridges and hubs work at layer 1 or 2 of the Open System Interconnection (OSI) model and are invisible to hosts sending packets at layer 3 using logical IP addresses. Routers, on the other hand, use one or more layer 3 routing protocols to exchange route information and maintain route tables comprising best paths to various destinations. The destinations in the route table can be prefixes as well as individual IP addresses. While an interface on a router may be bi-directional, best paths in route tables are unidirectional. The best path for a destination in a route table directs a router to forward a packet addressed to the destination to a particular next hop specified for the path. But a best path does not specify an interface on a router at which a packet must be received. A receiving router typically can only influence a sending router's paths by route information exchanged through routing protocols.

In the Internet, an autonomous system (AS) is a collection of IP networks and routers, under the control of one or more entities that presents a common routing policy to the Internet. Within a single AS, Interior Gateway Protocols (IGPs) such as IGRP, EIGRP, OSPF, and RIP can be used to exchange route information. Among separate autonomous systems, Exterior Gateway Protocols (EGPs) such as EGP and BGP can be used to exchange route information.

BGP is the core routing protocol of the Internet. The primary function of a BGP speaker, which can be a router running BGP as one of its supported routing protocols, is to exchange network reachability information with other BGP speakers, including information about the list of autonomous systems involved in a path and other attributes related to the path.

A router at the boundary of an autonomous system that exchanges route information with a router in another autonomous system over external BGP (eBGP) is called a border router. The route information learned by a border router may be redistributed to other BGP speakers in the same autonomous system over internal BGP (iBGP). The route information learned by one routing protocol can also be redistributed to other routing protocols.

BGP can be used by an internetworked system to implement multihoming, which is a technique to maintain network performance and resiliency in the event of a failure or congestion condition affecting a single service provider by connecting the internetworked system to two or more service providers. A multihomed internetworked system can use a protocol like BGP running on one or more border routers to inform the rest of the Internet that it can be reached over multiple routes through two or more service providers.

A BGP speaker determines the best path among candidate paths over which a packet may possibly be forwarded by looking at a number of attributes relating to the paths. Such attributes include, for example, local preference, AS path and a multi exit discriminator (MED) metric. On routers from Cisco Systems, Inc, San Jose, Calif., a weight attribute can also be assigned to a candidate path and taken into account in path comparison. Once the best path for a destination is determined by a routing protocol such as BGP, a corresponding route is updated or created in a route table and, possibly, a previous route to the destination corresponding to a previous best path determination may be removed from the route table. This route typically contains information about the destination, next hop, interface, and metric, which may be mapped from attributes associated with the best path in the routing protocol.

A router's behaviors in routing protocols can be controlled by a routing policy. A routing policy influences the flow of route information exchanged through routing protocols. For example, for route information received by a router, a routing policy can filter candidate paths based on access lists, prefixes, communities, route maps, accept some paths, accept and modify some other paths, and reject still other paths. For route information to be sent by a router, a routing policy can filter paths based on the same constructs mentioned, allow some paths to be exposed to other routers, allow and modify some other paths, and prevent still other paths from being exchanged. In particular, attributes such as weight, local preference, AS path and multi-exit discriminator (MED) of a path can also be modified by the routing policy. Also, the mapping from best paths in a routing protocol to routes in a route table in terms of destination, next hop, interface and metric can be controlled by the routing policy.

Likewise, a router's behavior in forwarding packets can be controlled by policy-based routing (PBR). PBR binds with an interface and directs the interface how to handle a received packet. Specifically, whether a packet should be forwarded or dropped, where a packet should be forwarded, and how fields in a packet should be set, can all be directly controlled by PBR. Under PBR, packets to be forwarded are classified into different classes. The criteria for packet classification can be directly based on attributes associated with various layers in OSI model, not limited to just layer 3 IP attributes. For example, the classification, and further the forwarding, of a packet can be based on prefixes or applications associated with the packet. Packets that do not match criteria for any class are routed in a regular, non-PBR way, i.e., through a route table. For examples, a packet associated with an HTTP application from a content server can be in a class; a packet associated with a database system in a certain prefix in another class; a packet associated with VoIP in yet another class; and all other packets not belonging to any class defined under PBR are routed in a regular way through a route table.

Different actions may be taken with respect to packets in different classes. For example, a VoIP packet may be specifically directed to a path that has low delay and little jitter. Furthermore, before forwarding, the VoIP packet may be specially marked by setting values of fields inside the packet.

The term "best path" ordinarily refers to a preferred path among all candidate paths for a destination in a Route Information Base (RIB) maintained by a routing protocol such as BGP. As used in this description and in the appended claims, the term "best path" may refer to a route—possibly corresponding to a best path in a RIB maintained by a routing protocol—in a route table learned through a routing protocol or advised under a routing policy. Alternatively, the term "best path" may also refer to a path specified by PBR for a class of packets based on a prefix or application.

In operation, establishing routing policy or PBR, which directly or indirectly influences the determination of best paths, is often based on non real-time information, e.g., statistics collected with respect to service providers, or types of interfaces—such as 10/100 Ethernet or OC12—used, or packet loss, delay and reachability information gathered by such tools as "traceroute." Typically, policies are put in place for a lengthy time until some troubles are reported, e.g., by user complaints, or by some performance measuring tools, or until some configuration changes made somewhere in various autonomous systems impact the access of an internetworked system with the rest of the Internet. This heuristic and ad hoc approach to policy configuration is ill equipped to deal with a brownout condition relating to a service provider, where forwarding paths through the service provider's network experience a gradual deterioration, perhaps caused by some congested links within the service provider network.

The heuristic and ad hoc approach to policy configuration is also ill equipped to handle real-time traffic patterns, which may vary from time to time. For instance, a particular traffic pattern may overuse certain external interfaces, or exits, to a service provider, while under-use the others. Also, a type of traffic requiring short delay, low packet loss, or little jitter may instead be forwarded to a path that exhibits opposite characteristics, perhaps caused by some congested links within the service provider network.

While not a routing protocol, TCP is a connection-oriented transport protocol that is aware of congestion on a path. For example, TCP detects a drop in packets as congestion develops and immediately changes transmission parameters to compensate for the congestion ("backs off"). In some instances spurious back off occurs since the network itself might not be congested, but a packet might have been lost due to checksum corruption, heavy load on an host, etc. Thus the reduction in throughput by false back offs is often unnecessary.

To overcome this problem in TCP, an Explicit Congestion Notification (ECN) mechanism was developed, as described in IETF RFC 3168, the contents of which are herein incorporated by reference for all purposes as if originally set forth herein. ECN allows intermediary routers to explicitly communicate present or impending congestion condition to hosts. However, typically, the hosts still react to this notification by reducing the throughput of a TCP connection. This is undesirable because TCP may be handling a high throughput, time-critical application such as a real-time video stream. The problem can be avoided if, in place of taking a local remedial approach with respect to a single TCP application, overall traffic can instead be diverted or distributed in some optimal manner over all available external interfaces, e.g., by implementing changes in route tables, routing policies and PBRs.

Based on the foregoing, there is a need for an approach for dynamically and immediately updating best path based on real-time congestion feedback that does not suffer from limitations of prior approaches.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION OF THE PREFERRED EMBODIMENT

A method and apparatus for dynamically and immediately updating best path based on real-time congestion feedback is described. In the following description, for the purposes of explanation, numerous specific details are set forth in order to provide a thorough understanding of the present invention. It will be apparent, however, to one skilled in the art that the present invention may be practiced without these specific details. In other instances, well-known structures and devices are shown in block diagram form in order to avoid unnecessarily obscuring the present invention.

Embodiments are described herein according to the following outline:

1.0 General Overview
2.0 Structural and Functional Overview
3.0 Method of Monitoring Network Traffic Flows
4.0 Implementation Mechanisms—Hardware Overview
5.0 Extensions and Alternatives
1.0 General Overview The needs identified in the foregoing Background, and other needs and objects that will become apparent for the following description, are achieved in the present invention, which comprises, in one aspect, a method of dynamically and immediately updating best path based on real-time congestion feedback between two internetworked systems. The method comprises the steps of, on a first internetworked system, monitoring packets received from a second internetworked system, detecting that a received packet includes real-time information that signals a present or pending congestion condition on one path between the two internetworked systems, notifying a control logic of the real-time congestion information, receiving from the control logic control information defining a change in one or more of the paths, and changing the one or more paths from the external interfaces of the first internetworked system to the second internetworked system.

In another aspect, the present invention provides a method implemented by a corresponding control logic that comprises the steps of receiving, from a first internetworked system, real-time congestion information contained in a packet sent by a second internetworked system and providing, to the first internetworked system, control information relating to changing one or more paths between two internetworked systems.

In other aspects, the invention encompasses a computer apparatus and a computer-readable medium configured to carry out the foregoing steps.

2.0 Structural and Functional Overview

Figure 1:
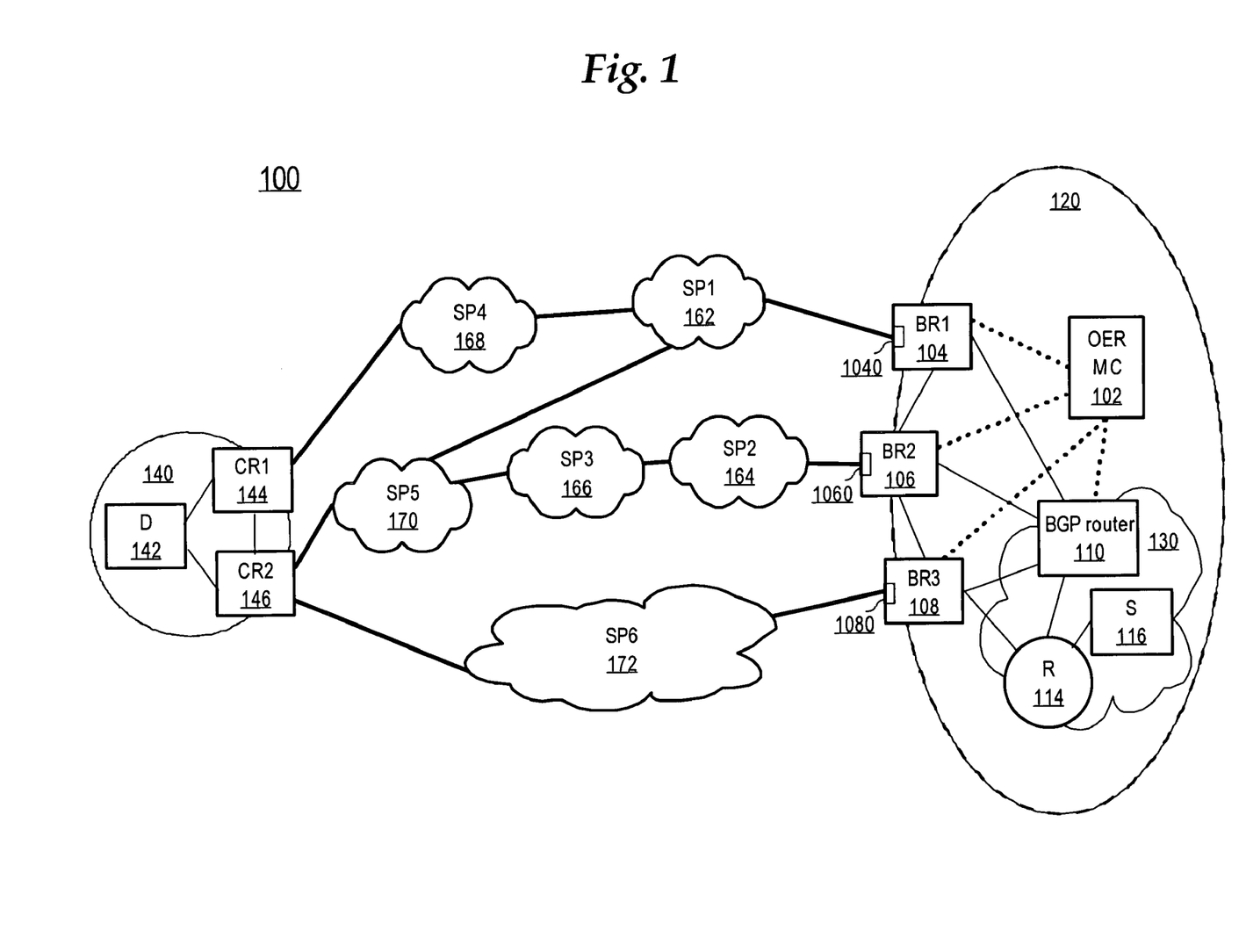
FIG. 1 depicts an example network with which an embodiment can be used applied.

FIG. 1 depicts an example network with which an embodiment can be used applied. FIG. 1 depicts internetworked systems 120, 140, which are communicatively coupled through a network of service providers (SP) 162-172, forming a combined network 100, which itself can be a part of the global Internet.

Internetworked system 120, as shown in FIG. 1, has three border routers (BR) 104-108, which have external interface blocks 1040, 1060 and 1080 to connect directly to service providers 162, 164 and 172. Each of external interface blocks 1040, 1060 and 1080 may contain multiple external interfaces. A host (S) 116 located in a local area network (LAN) 130 connects to border routers 104-108 through an interior BGP router 110 and an interior router (R) 114.

Internetworked system 120 is multihomed because it connects to two or more service providers through its border routers 104-108. Border routers 104-108 may update their peers in other autonomous systems, and further the rest of the world, that multiple paths over service providers 162, 164 and 172 can be used to reach prefixes—such as LAN 130—or individual IP addresses—such as S 116—inside internetworked system 120. The route information provided in these updates can influence the best paths taken by routers in other autonomous systems when they attempt to deliver packets destined for an host inside internetworked system 120.

Furthermore, routes, routing policies and PBRs can be set up on the routers in internetworked system 120 to control forwarding in the egress direction of external interfaces in external interface blocks 1040, 1060 and 1080 for packets originated from internetworked system 120 but destined for an host in some other internetworked systems such as D 142 in internetworked system 140.

In one embodiment, an Optimized Exit Routing Master Controller (OER MC) 102 sets up routes, routing policies and PBRs on routers in internetworked system 120 that participate in optimizing exit routing. The term "exit" refers to the egress direction of an external interface on border routers 104-108 that connects to another autonomous system. Status and control information can be exchanged over, either direct or indirect, communication links between OER MC 102 and border routers 104-108. According to one embodiment, OER MC 102 and border routers 104-108 use a messaging protocol for communicating status and control information. For example, in one embodiment border routers 104-108 communicate real-time congestion information to OER MC 102 using SOAP messages over BEEP, or using a proprietary messaging format over BEEP. A suitable messaging protocol may combine an encoding scheme, a connection management system and a mechanism to authenticate on per-message basis. Alternatively, the messaging mechanism can use XMLRPC over BEEP. The particular form of message transport and message encoding are not critical to an embodiment.

Internetworked system 140 has two routers 144, 146 and an host (D) 142. Routers 144 and 146 directly connect to service providers 168-172. Internetworked system 140 may or may not be multihomed. Further, internetworked system 140 may or may not be an autonomous system by itself. For example, in one embodiment, internetworked system 140 is a part of an autonomous system of a service provider, such as the AS of SP5 170. The prefix for internetworked system 140 may be assigned from an IP address space owned by a service provider such as SP5 170.

Like internetworked system 120, each of service providers 162-172 is an autonomous system (AS). Multiple paths exist between internetworked systems 120 and 140. Some of those paths involve only one autonomous system between 120 and 140. Specifically, paths between external interfaces on border router 108 and router 146 involves only one autonomous system in between, namely service provider 172. On the other hand, paths between external interfaces on border router 106 and router 146 involves three autonomous systems in between, namely service providers 164, 166 and 170. Alternatively, paths between external interfaces on border router 104 and CR1 or CR2 involves two autonomous systems in between, namely either service providers 162 and 168 or service providers 162 and 170.

Typically, paths going through the fewest service providers, or shortest AS paths are considered as best paths as they involve the fewest autonomous systems path hops. For example, in FIG. 1, the paths, (108)->172->(146), are favored over the other paths, say, (106)->164->166->170->(146), because the former AS path involves the fewest autonomous systems in between. However, choosing a best path based on the shortest AS path may not be optimal all the times. For examples, network elements along the best path can be overused and eventually become congested; a service provider transited by the best path may be experiencing congestion or internet "brownout"; and a different path may entail a better monetary cost. Thus, it is necessary to compare paths also on other attributes such as local preference, MED and weight in selecting best paths.

Figure 2:
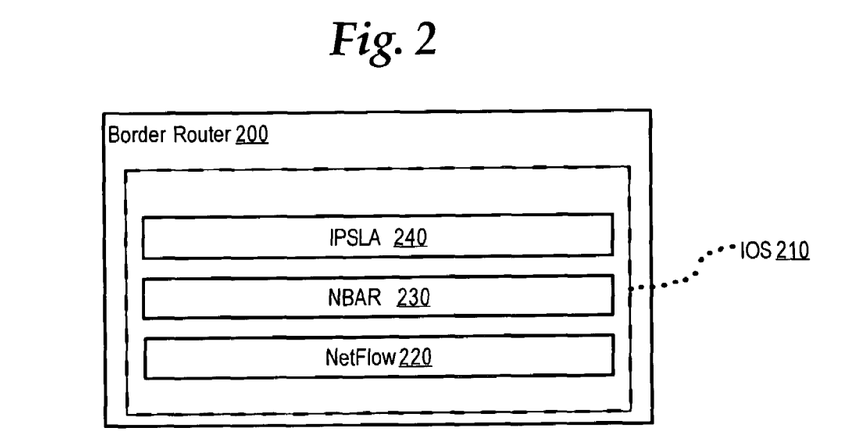
FIG. 2 is a block diagram depicting functional elements running on a border router to detect and provide notification for real-time congestion feedback, in one embodiment.

FIG. 2 is a block diagram depicting functional elements of a border router that can detect and provide notification for real-time congestion feedback. For example, border router 200 may host Cisco IOS® Software, available from Cisco Systems, Inc, San Jose, Calif., and the functional elements may comprise functional units of Cisco IOS. In one embodiment, functional elements of border router 200 comprise a NetFlow™ service 220, Network Based Application Recognition (NBAR) service 230, and IP Service Level Agent (IP SLA) service 240. FIG. 2 shows NetFlow service 220, Network Based Application Recognition (NBAR) service 230, and IP Service Level Agent (IP SLA) service 240 merely as examples, and other embodiments may use different elements that perform similar functions as described herein, including software elements from different vendors.

NBAR service 230 is a classification engine that can recognize a wide variety of applications, including Web-based applications and client/server applications that dynamically assign TCP or UDP port numbers.

NetFlow service 220, with NBAR service 230, enables border router 200 to monitor network flows on its external interfaces. In one embodiment, a network flow is a unidirectional sequence of packets between given source and destination hosts. Network flows are highly granular and can be identified by various flow related attributes such as IP addresses and transport layer application port numbers. Net- Flow service 220 can also optionally identify a flow by IP Protocol type, Type of Service (ToS) and the input interface identifier. Once a packet is received from another internetworked system, NetFlow service 220, along with NBAR service 230, can identify the prefix or application associated with the packet. In addition, NetFlow service 220 can examine any field in IP or TCP header for congestion condition indication.

IP SLA service 240 is an active probing and monitoring service that covers a wide range of protocols and applications. IP SLA service 240 can send active probing packets and receives response packets in UDP, TCP, ICMP, HTTP, DNS, DHCP, FTP, etc. For example, instead of waiting passively for some network events to trigger ICMP packets, border router 200 can actively detect whether a destination is reachable by sending a suitable probing packet to the destination from IP SLA 240 to a remote IP SLA responder on a router, say, 146 in FIG. 1.

IP SLA service 240 provides border router 200 a capability to measure delay, jitter, corrupted packets or packet loss by generating periodic or on demand traffic to, and monitoring the response traffic from, a remote IP SLA responder. Additionally, IP SLA can also detect real-time congestion condition through the use of probing packets in a format in accordance with the requirements set forth in RFC 3168. In a preferred embodiment, OER MC 102 receives probing information from IP SLA over the communication links between OER MC 102 and border routers 104-108.

Multiple external interfaces from such border routers as 104-108 in FIG. 1 to such service providers as 162, 164 and 172 can be optimized to avoid congestion, minimize cost, improve performance, and balance load among the multiple external interfaces. As stated, according to one embodiment, OER MC 102 controls the optimization with respect to the multiple external interfaces. In one embodiment, OER MC 102 has stored rules and policies to be complied in generating routes, routing policies and PBRs for routers. OER MC 102 may be implemented on a separate device as shown or one of the routers in internetworked system 120 such as BGP router 110 in FIG. 1.

Figure 3:
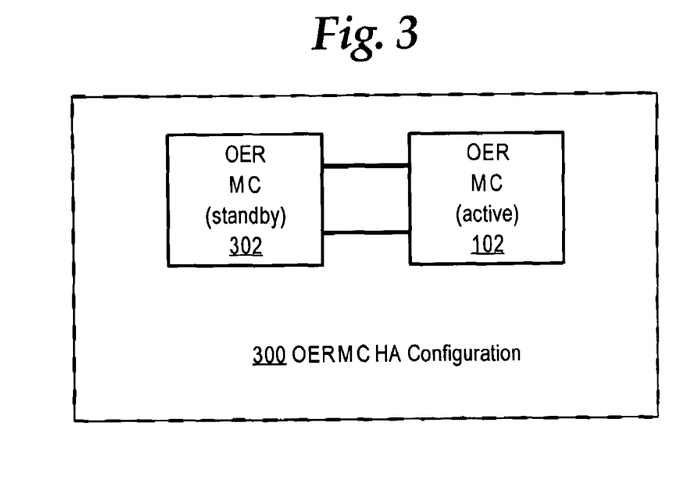
FIG. 3 is a block diagram depicting a standby OER MC paired with an active OER MC to form a high availability configuration.

FIG. 3 is a block diagram depicting a standby OER MC paired with an active OER MC to form a high availability configuration. In one embodiment, a standby OER MC can be paired with an active OER MC to form a high availability configuration, as shown in FIG. 3. In such an embodiment, if the active OER MC 102 fails, a standby OER MC 302 can quickly become active and take over the task of optimizing exit—external interface—routing without much downtime. The two OER MC 102 and 302 may have communication links between themselves to exchange status, control, heartbeat and checkpoint information. Redundant communication links can be provided between each OER MC to each border router that participates in exit—external interface—optimization. For example, OER MC 102 can have redundant links to each of border routers 104-108 and BGP router 110 in FIG. 1.

Figure 4:
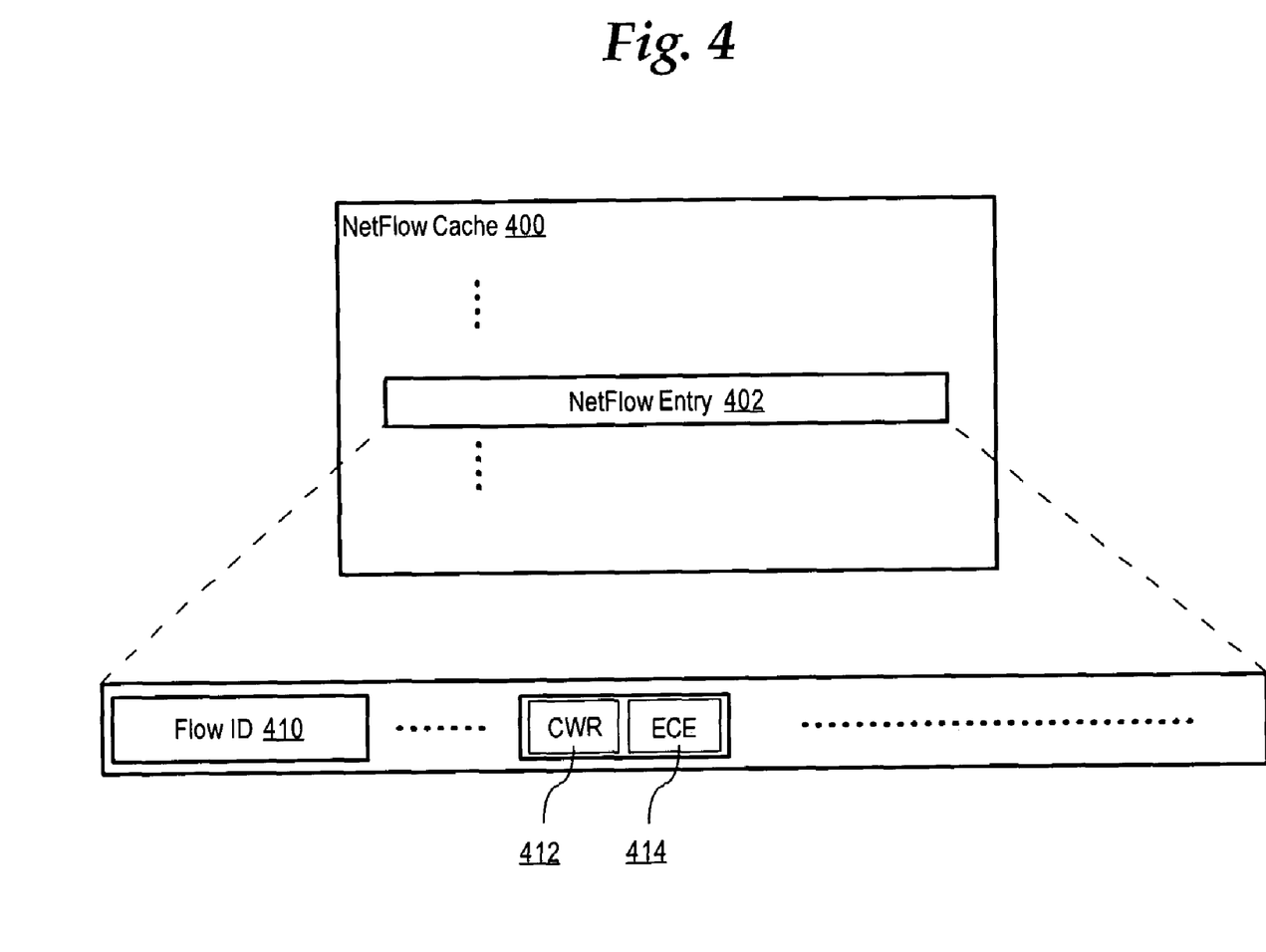
FIG. 4 illustrates a NetFlow cache in an embodiment.

FIG. 4 illustrates a NetFlow cache in an embodiment. NetFlow Cache 400 has a number of NetFlow entries, each of which corresponds to a monitored network flow. The ellipsis in NetFlow Cache 400 indicates there may be entries other than a NetFlow Entry 402 in the cache.

NetFlow Entry 402 contains a Flow ID 410 uniquely identifying a network flow. In one embodiment, Flow ID 410 can be a five-tuple of destination IP address, destination port, source IP address, source port, and protocol. In another embodiment, Flow ID 410 can be destination or source network prefixes, individually or in combination. Flow ID 410 can optionally be further identified by other attributes in conjunction with those mentioned above.

NetFlow Entry 402 can also contain, among others, two monitored attributes from a TCP header: Congestion Window Reduced (CWR) 412 and Explicit Congestion notification Echoed (ECE) 414. These two fields can be used to provide an explicit congestion notification function described in RFC 3168. The ellipsis in NetFlow Entry 402 indicates there may be attributes other than those forming Flow ID 410 and the two monitored TCP attributes 412 and 414 in the entry.

Figure 5:
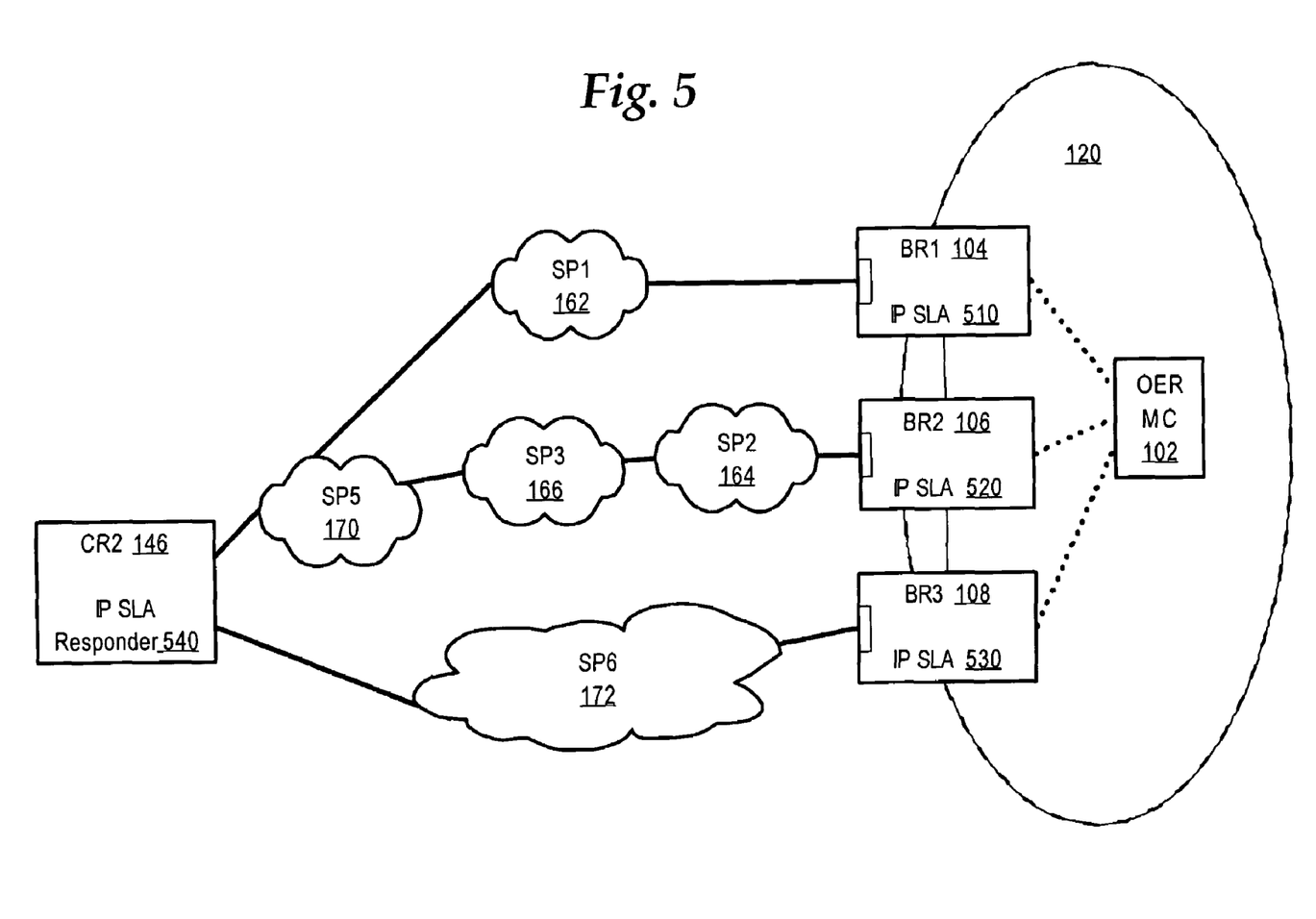
FIG. 5 depicts an example network in which OER MC can actively measure network condition relating to paths from external interfaces on border routers to a concentration point.

An OER MC can passively monitor network flows on multiple external interfaces through NetFlow or NBAR features deployed on border routers, and can actively probe network condition through IP SLA. FIG. 5 illustrates a network configuration in which OER MC 102 can actively probe network condition relating to paths from external interfaces on border routers 104-108 to a concentration point, router 146, in one embodiment.

Router 146 is a concentration point because multiple paths from the external interfaces on border routers 104-108 of the internetworked system 120 all leads to router 146. An IP SLA responder 540 can be deployed on the concentration point, router 146. To probe network condition between border routers 104-108 and router 146 in terms of delay, jitter, packet loss, corrupted packets, or reachability of a destination, IP SLAs 510-530 on border routers 104-108 each can send appropriate probing packets to, and examine response packets and their timings from, IP SLA Responder 540 on router 146.

Figure 6:
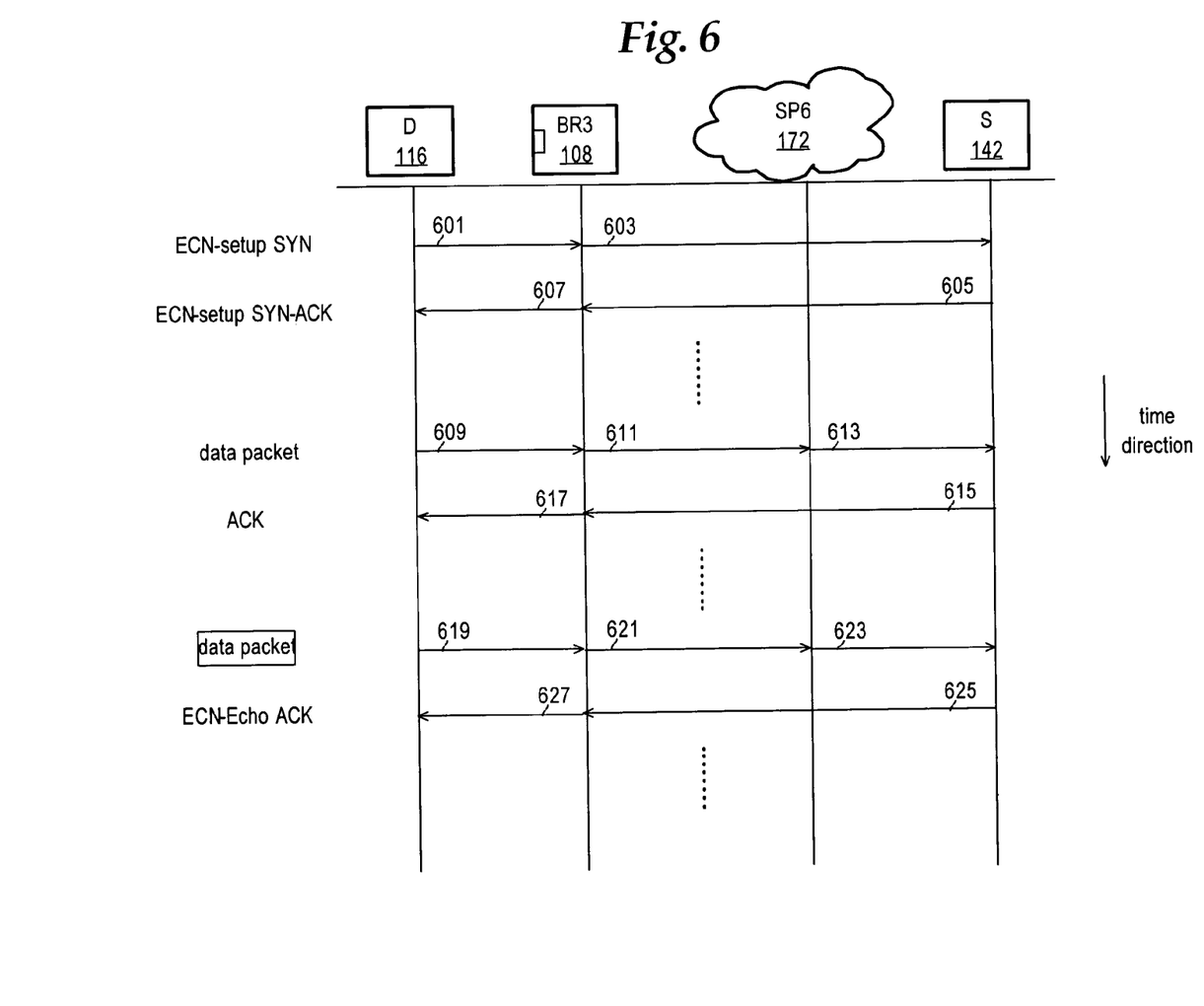
FIG. 6 is a use case diagram relating to a TCP application.

3.0 Method and Apparatus for Dynamically and Immediately Updating Best Path Based on Real-Time Congestion Feedback FIG. 6 is a use case diagram relating to a TCP application. This diagram illustrates a situation where two network flows relating to a TCP application are monitored by the apparatus of the present invention, and how a congestion condition on a path is detected. For purposes of illustrating a clear example, a limited number of actors participating in flows are represented in FIG. 6; in alternative embodiments, any number of actors may participate.

Referring to FIG. 1, to illustrate a clear example, assume a TCP connection is established between hosts 116, 142. Thus, a first network flow relating to the TCP connection is a TCP flow from host 116 in internetworked system 120 to host 142 in internetworked system 140. A Flow ID 410 for this flow comprises the IP address of host 142 as destination IP address, the TCP port on host 142 for the TCP application as destination port, the IP address of host 116 as source IP address, the TCP port on host 116 for the TCP application as source port, and TCP as protocol. If one of the TCP ports were a well-known port associated with FTP service, then this Flow ID 410 would in fact identify an FTP application running between two hosts 116 and 142.

Continuing with the example, a second network flow is a TCP flow from host 142 in internetworked system 140 to host 116 in internetworked system 120. A Flow ID 410 for this flow comprises the IP address of host 116 as destination IP address, the TCP port on host 116 for the TCP application as destination port, the IP address of host 142 as source IP address, the TCP port on host 142 for the TCP application as source port, and TCP as protocol.

In various embodiments, the two flows can optionally be correlated, aggregated and reported to OER MC 102 by NetFlow service 220 on border router 108 as a single flow record. The two flows can also optionally be identified by the prefixes associated with the networks of which the source or destination IP addresses are parts, respectively.

In step 601 the TCP application causes host 116 to send an ECN-setup SYN packet. An ECN-setup SYN packet signals a willingness on the part of the sender to use Explicit Congestion Notification (ECN) described in RFC 3168. This ECN-setup SYN packet arrives at border router 108, to be forwarded through an external interface on border router 108 to host 142. In step 603 NetFlow service 220 on border router 108 creates a NetFlow Entry 402 in NetFlow Cache 400 for this new flow. In the meantime, this ECN-setup SYN packet is forwarded to service provider 172, which simply continues to forward the packet onto the next hop. Eventually, the packet is delivered to host 142.

If host 142 agrees to use ECN for this TCP session, in step 605 host 142 sends an ECN-setup SYN-ACK back to host 116. This ECN-setup SYN-ACK packet goes through service provider network and eventually arrives at an external interface on border router 108. In step 607 NetFlow service 220 on border router 108 creates a NetFlow Entry 402 in NetFlow Cache 400 for this new flow. In the meantime, this ECN-setup SYN-ACK packet is forwarded to host 142. An additional ACK, not shown in FIG. 6, is communicated from host 116 to host 142 to complete connection setup.

This exchange of ECN-setup SYN and ECN-setup SYN-ACK packets between hosts 116, 142 sets up a TCP connection and an agreement between the two hosts for ECN.

An ECN field in an IP header comprises an ECN-capable Transport (ECT) bit and a Congestion Experienced (CE) bit, and is used for Explicit Congestion Notification. RFC 3168 specifies values for such bits. A sender of a packet can signal to intermediary packet-forwarding devices to set the ECN field in the packet in accordance with RFC 3168 if the intermediary devices experience network congestion individually or in combination.

Initially, the sender of a packet sets the ECN field in a packet using an ECT(0) codepoint (ECT bit=1; CE bit=0) or an ECT(1) codepoint (ECT bit=0; CE bit=1). Thereafter, an intermediary router between internetworked systems 120 and 140 may alter the initial ECT(0) or ECT(1) codepoint into a CE codepoint (ECT bit=1; CE bit=1), in order to signal network congestion. Intermediary routers may employ active queue management for packets on the way to a next hop. For examples, routers may use Random Early Detect (RED), Weighted Random Early Detect (WRED), tail drop, random, Weighted Fairness Queuing (WFQ), custom queuing as a way for active queue management.

Typically, in conjunction with active queue management, routers have ability to take actions such as forward, drop, or forward with markdown—marking down priority of a packet—when a present or impending congestion condition is experienced. According to an embodiment of the present invention, first, when experiencing a present or impending congestion condition, if a packet is found to be an ECN packet, the routers should preferably set a CE codepoint and forward it to next hop instead of dropping it. Second, if the CE codepoint of a packet is found to have been marked by a preceding router, the routers should preferably respect the marking and simply forward the packet to next hop instead of dropping it.

Referring again to FIG. 6, following the setup of the TCP connection, data and ACK packets may be exchanged between hosts 116 and 142. In a first scenario, network congestion is neither experienced nor pending. For example, in step 609 host 116 sends a data packet to host 142. As the two hosts of this TCP application, hosts 116 and 142, have agreed to use ECN in steps 601-607, the ECN field in the IP header of the data packet is set to either an ECT(0) or ECT(1) codepoint. This data packet arrives at border router 108, to be forwarded through an external interface on border router 108 to host 142. In step 611 NetFlow 220 on border router 108 updates the NetFlow Entry 402 in NetFlow Cache 400 created in step 603 for this flow. In the meantime, this data packet is forwarded to service provider 172. If no congestion is experienced, service provider 172 simply continues to forward the packet onto the next hop in step 613. Eventually, the data packet is delivered to host 142.

In step 615, host 142 sends an ACK packet to acknowledge receipt of data packets received including the data packet sent by host 116 in step 609. If none of those data packets carries a CE codepoint, host 142 refrains from setting the ECE flag in the TCP header of the ACK packet. This ACK packet goes through service provider network, i.e., service provider 172, and eventually arrives at an external interface on border router 108. In step 617 NetFlow 220 on border router 108 updates the NetFlow Entry 402 in NetFlow Cache 400 created in step 607 for this flow. In the meantime, this ACK packet is forwarded to host 142.

In a second scenario, data and ACK packets may be exchanged between hosts 116 and 142 when network congestion is either already experienced or pending. For example, in step 619 host 116 sends a data packet to host 142. The ECN field in the IP header of the data packet is set to either an ECT(0) or ECT(1) codepoint to signal that any intermediary device may set a CE codepoint if network congestion is experienced or pending. This data packet arrives at border router 108, to be forwarded through an external interface on border router 108 to host 142. In step 621 NetFlow 220 on border router 108 updates the NetFlow Entry 402 in NetFlow Cache 400 created in step 603 for this flow. In the meantime, this data packet is forwarded to service provider 172. However, since in this scenario network congestion is experienced or pending, service provider 172 sets a CE codepoint in the ECN field of the IP header of the packet and continues to forward the packet onto the next hop in step 623. Eventually, the data packet is delivered to host 142.

In step 625, host 142, after seeing at least one of the previously unacknowledged data packets contains a CE codepoint, sends an ECN-Echo ACK with the ECE flag set in the TCP header to not only acknowledge receipt of data packets received including the data packet sent by host 116 in step 619, but also signal a real-time network congestion condition on a unidirectional path from host 116 to host 146.

In a preferred embodiment, host 142 authenticates a packet with a CE codepoint that has been set by an intermediary router. The authentication can be based on, e.g., source IP address and port, destination IP address and port, and TCP sequence number.

The ECN-Echo ACK packet, sent by host 142, goes through service provider network, in this case service provider 172, and eventually arrives at an external interface on border router 108. In step 627 NetFlow™ 220 on border router 108 immediately detects that it has received an ECN-Echo ACK on an external interface. Consequently, border router 108 immediately notifies OER MC 102 of the network congestion condition on the unidirectional path from host 116 to host 146 via a message through the communication links between border 108 and OER MC 102. According to one embodiment, the message can be sent from border router 108 to OER MC 102 in a proprietary protocol.

OER MC 102 can react to this congestion notification message and initiate corrective steps to lessen the impact of the congestion condition. The corrective steps include installing, removing and updating routes, route maps, routing policies and PBRs on border routers 104-108 and other routers in internetworked system 120 such as BGP router 110 in FIG. 1.

The corrective steps may also include adjusting local preference, weight, MED metric settings for paths on border routers 104-108. The corrective steps may also include prepending AS paths in a given path to be shared among BGP speakers. To effectuate the corrective steps, OER MC 102 sends one or more messages to routers in internetworked system 120 which participate in the exit routes optimization. The messages contain, e.g., control information embodying the corrective steps that should be taken by various routers.

In one embodiment, OER MC 102 has a hold-down timer on per-application or per-prefix basis to prevent route oscillation (flapping) and to provide dampening. The hold-down timer starts as soon as the application or the prefix is moved from one exit to another. An application or prefix cannot be moved to another path if the hold-down timer is still running, unless the application or prefix becomes unreachable on the existing path. The hold-down timer setting specifies the minimum period of time that a new path must be used before an alternative exit can be selected. The hold-down time is configurable and is 5 minutes by default.

In an embodiment, if OER MC 102 receives ECN feedback on a best path for a prefix or an application, OER MC 102 optionally does not change the path associated with the prefix or application, but instead changes routes, routing policies and PBRs to divert traffic for certain other prefixes or applications such as VoIP or video applications to paths which are better.

OER MC 102 can, when marking a path as congested, store this information in a history database. Past ECN information on a path can be used as a metric in selecting the best path. For example, when there is a tie between two candidate paths, the path that has experienced no or little congestion condition is selected over the one that has experienced some in the past.

Referring again to FIG. 6, when the ECN-Echo ACK packet is received, NetFlow 220 service updates the NetFlow Entry 402 in NetFlow Cache 400 created in step 607 for this flow. Border router 108 forwards the ECN-Echo ACK packet to host 142.

Figure 8A:
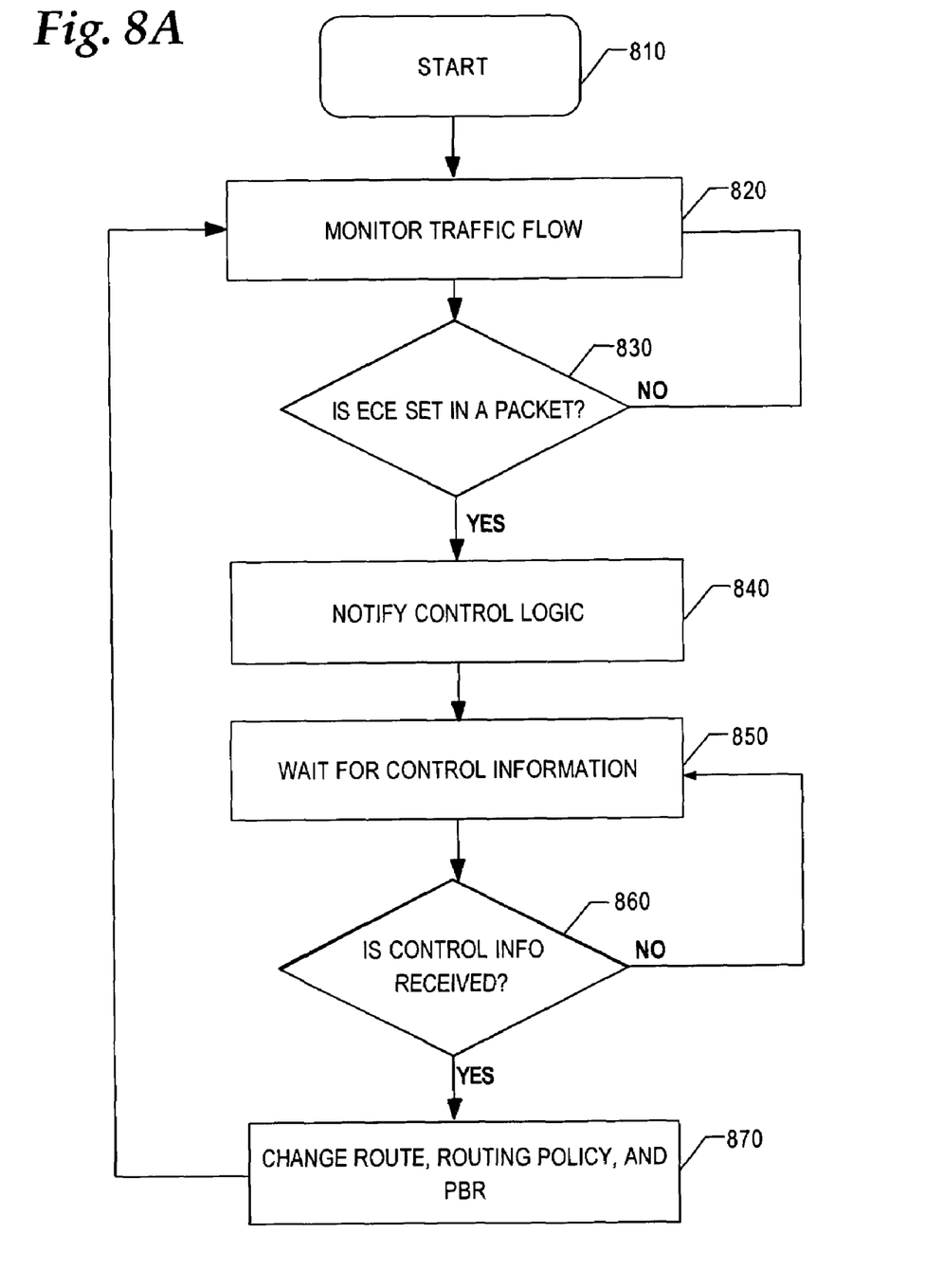
FIG. 8A is a flow diagram illustrating aspects of an OER border router application.

FIG. 8A is a flow diagram illustrating aspects of an OER border router application. In block 810 an OER border router application starts. In block 820, packets relating to traffic flows in and out of the border router are monitored.

In block 830, for a TCP packet received in the ingress direction of an external interface on the border router, the TCP header of the packet is checked to see if an ECE flag is set. If the ECE flag is not set, in block 820, traffic flows are continued to be monitored. However, if the ECE flag is set, then, in block 840, the information associated with the received packet is immediately provided to OER MC 102 over communication links between the border router and OER MC 102.

In block 850, the OER border router application waits for control information from OER MC 102. If the control information is not received in block 860, the application continues the wait in block 850. However, if the control information is received in block 860, then, in block 870, the application changes routes, routing policies and PBRs in accordance with the control information received. After the change is completed, the application goes back to block 820 to continue monitoring traffic flows.

Figure 8B:
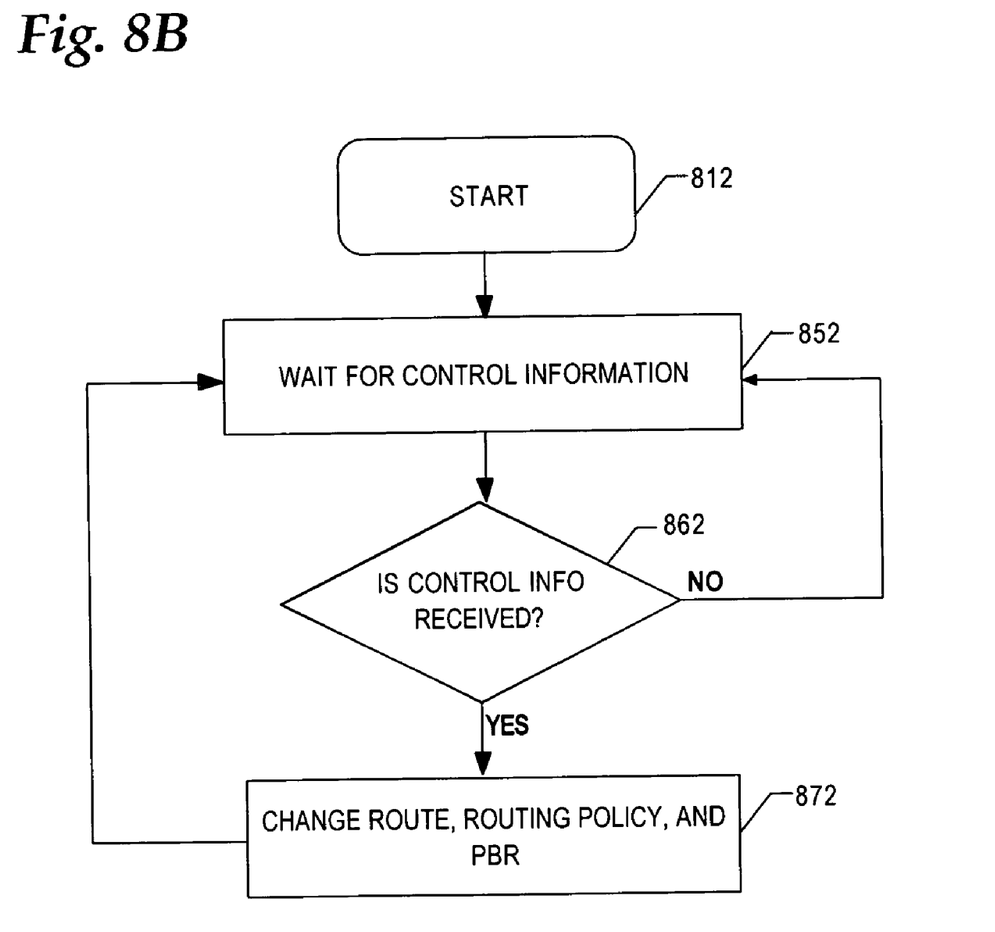
FIG. 8B is a flow diagram illustrating aspects of an interior router application.

FIG. 8B is a flow diagram illustrating aspects of an interior router application. In block 812 an OER interior router application starts. In block 852, the OER interior router application waits for control information from OER MC 102. If the control information is not received in block 862, the application continues the wait in block 852. However, if the control information is received in block 862, then, in block 872, the application changes routes, routing policies and PBRs in accordance with the control information received. After the change is completed, the application goes back to block 852 to continue waiting for control information.

Figure 9:
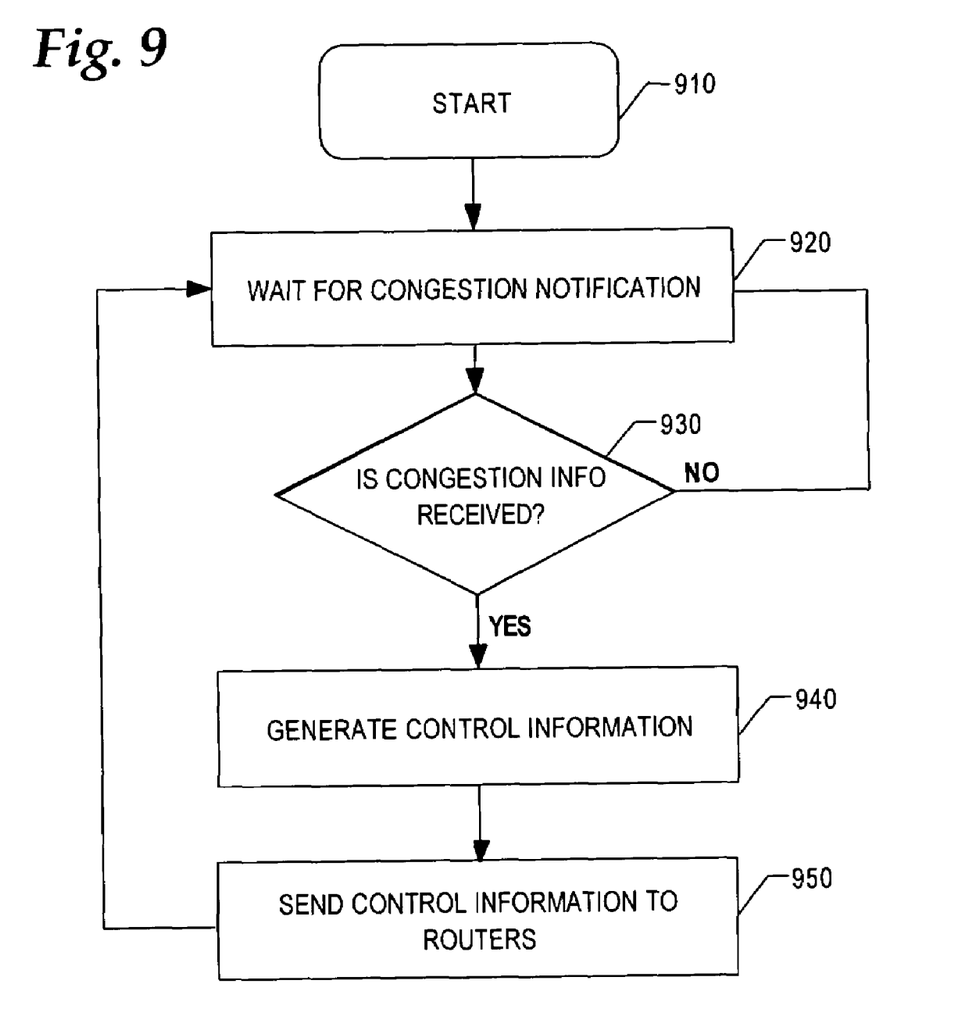
FIG. 9 is a flow diagram illustrating aspects of an OER MC application.

FIG. 9 is a flow diagram illustrating aspects of an OER MC application. In block 910 an OER MC application starts. In block 920, the OER MC application waits for congestion notification from border routers 104-108. If the congestion notification is not received in block 930, the application continues the wait in block 920. However, if the congestion notification is received, then, in block 940, the application generates control information relating to changes of routes, routing policies and PBRs on all the routers participating in exit optimization. In block 950, the generated control information is sent to all the routers participating in exit optimization. After the control information is sent, the application goes back to block 920 to continue waiting for congestion notification.

It will be appreciated by the skilled reader that the steps described herein can be implemented in any appropriate manner, by incorporating appropriate code into an existing route optimization application such that detailed description is not required herein.

4.0 Implementation Mechanisms—Hardware Overview

Figure 7:
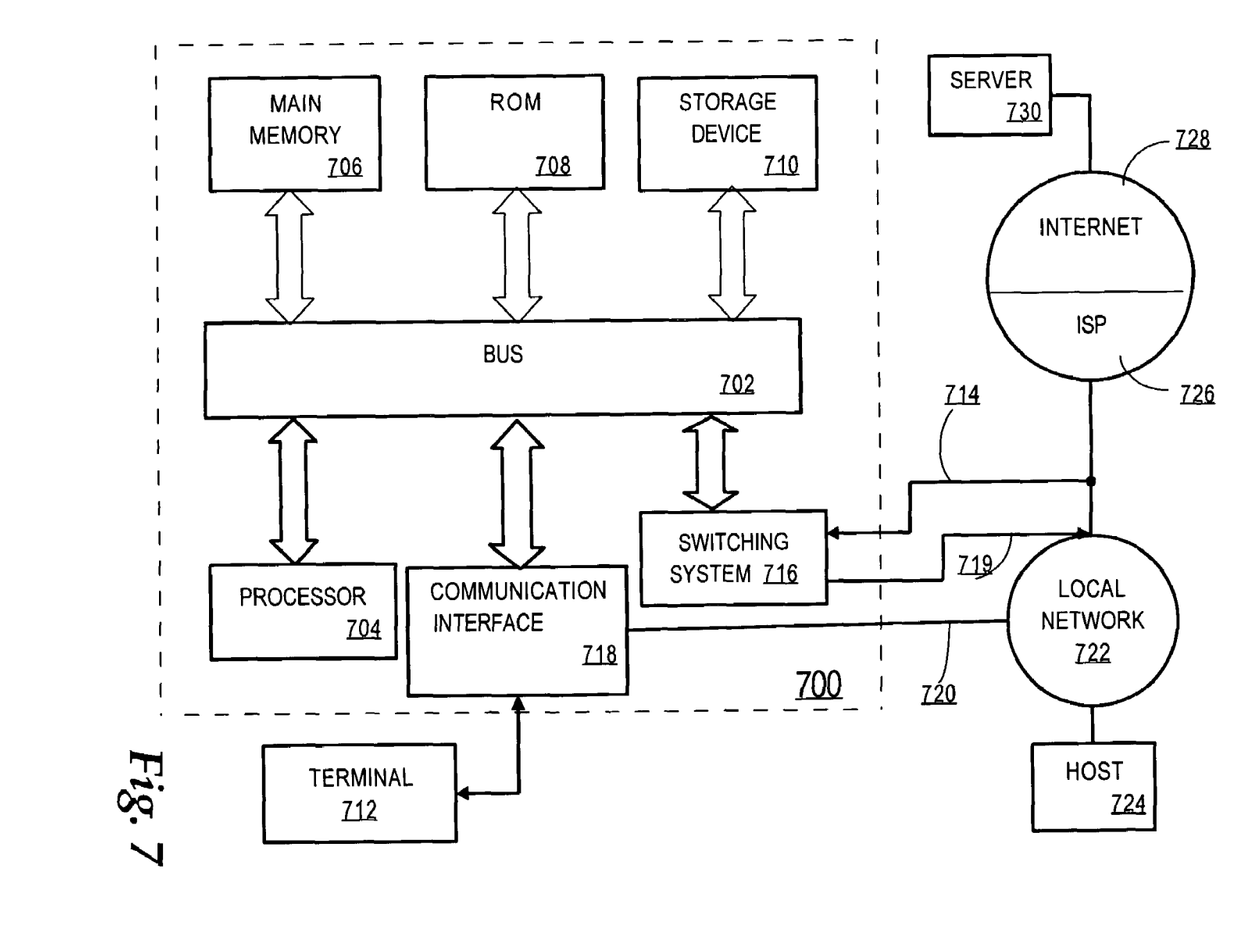
FIG. 7 is a block diagram that illustrates a computer system upon which an embodiment may be implemented.

FIG. 7 is a block diagram that illustrates a computer system 700 upon which an embodiment may be implemented. The preferred embodiment is implemented using computer programs running on one or more network elements.

Computer system 700 includes a bus 702 or other communication mechanism for communicating information, and a processor 704 coupled with bus 702 for processing information. Computer system 700 also includes a main memory 706, such as a random access memory (RAM), flash memory, or other dynamic storage device, coupled to bus 702 for storing information and instructions to be executed by processor 704. Main memory 706 also may be used for storing temporary variables or other intermediate information during execution of instructions to be executed by processor 704. Computer system 700 further includes a read only memory (ROM) 708 or other static storage device coupled to bus 702 for storing static information and instructions for processor 704. A storage device 710, such as a magnetic disk, flash memory or optical disk, is provided and coupled to bus 702 for storing information and instructions.

A communication interface 718 may be coupled to bus 702 for communicating information and command selections to processor 704. Interface 718 is a conventional serial interface such as an RS-232 or RS-422 interface. An external terminal 712 or other computer system connects to the computer system 700 and provides commands to it using the interface 714. Firmware or software running in the computer system 700 provides a terminal interface or character-based command interface so that external commands can be given to the computer system.

A switching system 716 is coupled to bus 702 and has an input interface 714 and an output interface 719 to one or more external network elements. The external network elements may include a local network 722 coupled to one or more hosts 724, or a global network such as Internet 728 having one or more servers 730. The switching system 716 switches information traffic arriving on input interface 714 to output interface 719 according to pre-determined protocols and conventions that are well known. For example, switching system 716, in cooperation with processor 704, can determine a destination of a packet of data arriving on input interface 714 and send it to the correct destination using output interface 719. The destinations may include host 724, server 730, other end stations, or other routing and switching devices in local network 722 or Internet 728.

The invention is related to the use of computer system 700 for providing QoS and fault isolation in BGP traffic, address families and routing topologies. According to one embodiment of the invention, providing QoS and fault isolation in BGP traffic, address families and routing topologies are provided by computer system 700 in response to processor 704 executing one or more sequences of one or more instructions contained in main memory 706. Such instructions may be read into main memory 706 from another machine-readable medium, such as storage device 710. Execution of the sequences of instructions contained in main memory 706 causes processor 704 to perform the process steps described herein. One or more processors in a multi-processing arrangement may also be employed to execute the sequences of instructions contained in main memory 706. In alternative embodiments, hard-wired circuitry may be used in place of or in combination with software instructions to implement the invention. Thus, embodiments of the invention are not limited to any specific combination of hardware circuitry and software.

The term "machine-readable medium" as used herein refers to any medium that participates in providing instructions to processor 704 for execution. Such a medium may take many forms, including but not limited to, non-volatile media, volatile media, and transmission media. Non-volatile media includes, for example, optical or magnetic disks, such as storage device 710. Volatile media includes dynamic memory, such as main memory 706. Transmission media includes coaxial cables, copper wire and fiber optics, including the wires that comprise bus 702. Transmission media can also take the form of acoustic or light waves, such as those generated during radio wave and infrared data communications.

Common forms of machine-readable media include, for example, a floppy disk, a flexible disk, hard disk, magnetic tape, or any other magnetic medium, a CD-ROM, any other optical medium, punch cards, paper tape, any other physical medium with patterns of holes, a RAM, a PROM, and EPROM, a FLASH-EPROM, any other memory chip or cartridge, a carrier wave as described hereinafter, or any other medium from which a computer can read.

Various forms of computer readable media may be involved in carrying one or more sequences of one or more instructions to processor 704 for execution. For example, the instructions may initially be carried on a magnetic disk of a remote computer. The remote computer can load the instructions into its dynamic memory and send the instructions over a telephone line using a modem. A modem local to computer system 700 can receive the data on the telephone line and use an infrared transmitter to convert the data to an infrared signal. An infrared detector coupled to bus 702 can receive the data carried in the infrared signal and place the data on bus 702. Bus 702 carries the data to main memory 706, from which processor 704 retrieves and executes the instructions. The instructions received by main memory 706 may optionally be stored on storage device 710 either before or after execution by processor 704.

Communication interface 718 also provides a two-way data communication coupling to a network link 720 that is connected to a local network 722. For example, communication interface 718 may be an integrated services digital network (ISDN) card or a modem to provide a data communication connection to a corresponding type of telephone line. As another example, communication interface 718 may be a local area network (LAN) card to provide a data communication connection to a compatible LAN. Wireless links may also be implemented. In any such implementation, communication interface 718 sends and receives electrical, electromagnetic or optical signals that carry digital data streams representing various types of information.

Network link 720 typically provides data communication through one or more networks to other data devices. For example, network link 720 may provide a connection through local network 722 to a host computer 724 or to data equipment operated by an Internet Service Provider (ISP) 726. ISP 726 in turn provides data communication services through the world wide packet data communication network now commonly referred to as the "Internet" 728. Local network 722 and Internet 728 both use electrical, electromagnetic or optical signals that carry digital data streams. The signals through the various networks and the signals on network link 720 and through communication interface 718, which carry the digital data to and from computer system 700, are exemplary forms of carrier waves transporting the information.

Computer system 700 can send messages and receive data, including program code, through the network(s), network link 720 and communication interface 718. In the Internet example, a server 730 might transmit a requested code for an application program through Internet 728, ISP 726, local network 722 and communication interface 718. In accordance with the invention, one such downloaded application provides for QoS and fault isolation in BGP traffic, address families and routing topologies as described herein.

The received code may be executed by processor 704 as it is received, and/or stored in storage device 710, or other non-volatile storage for later execution. In this manner, computer system 700 may obtain application code in the form of a carrier wave.

5.0 Extensions and Alternatives

The method can be applied in any appropriate network other than the Internet, in relation to any routing protocol, or on any appropriate network device or component in relation to any data type or element, for example data packets. In particular, the method can be applied in an intranet or extranet forming a suitable configuration similar to those illustrated in this description. Also, the method can be implemented on any device running a monitoring application such as NetFlow™ and the same or a different device running a route optimization application such as OER.

In the foregoing specification, the invention has been described with reference to specific embodiments thereof. It will, however, be evident that various modifications and changes may be made thereto without departing from the broader spirit and scope of the invention. The specification and drawings are, accordingly, to be regarded in an illustrative rather than a restrictive sense.

What is claimed is:

1. A method, comprising:
    monitoring packets received from an internetworked system, wherein the packets are received on one of a plurality of external interfaces of a networking device;
    detecting that a received packet includes real-time information that signals a present or pending congestion condition on a path from the external interfaces of the networking device to the internetworked system;
    wherein the present or pending congestion condition is experienced by a first traffic flow of data packets from the external interfaces of the networking device to the internetworked device;
    notifying a control logic of the real-time information;

receiving from the control logic control information defining a change in one or more paths from the external interfaces to the internetworked system;

wherein the change in the one or more paths addresses said present or pending congestion condition;

wherein the change diverts traffic of one or more other traffic flows of data packets to other paths that are different from the path;

wherein the change maintains the path for the first traffic flow of data packets; and changing the one or more paths from the external interfaces to the internetworked system.

2. A method as claimed in claim 1, comprising sending one or more packets from the networking device to an internetworked system, wherein the one or more packets are in a format that is markable by intermediary networking devices to signal a present or pending congestion condition.

3. A method as claimed in claim 1, wherein the received packet is a Transmission Control Protocol packet having a Explicit Congestion Notification Echo flag is set.

4. A method as claimed in claim 1 wherein monitoring comprises classifying packets from the internetworked system into traffic flows identified by attributes in the packets.

5. A method as claimed in claim 4 wherein one of the attributes identifying traffic flows is a prefix associated with an host in the internetworked system.

6. A method as claimed in claim 4 wherein one of the attributes identifying traffic flows is a prefix associated with an host in an internetworked system of which the networking device is a part.

7. A method as claimed in claim 4 wherein one or more attributes of the attributes identifying traffic flows also identify an application.

8. A method as claimed in claim 1 wherein notifying comprises sending, to the control logic probing information about delay, jitter, packet loss, and corrupted packets on one or more paths between the networking device and the internetworked system.

9. A method as claimed in claim 1, further comprising receiving from the control logic control information defining a change in one or more routing policies in the networking device, wherein the one or more routing policies are to be complied by the networking device when the networking device exchanges route information with other networking devices; and changing the one or more routing policies on the networking device.

10. A method as claimed in claim 1, further comprising receiving from the control logic control information defining a change in one or more forwarding policies in the networking device, wherein the one or more forwarding policies are to be complied by the networking device when the networking device forwards packets; and changing the one or more forwarding policies on the networking device.

11. A volatile or non-volatile computer readable medium comprising one or more sequences of instructions which, when executed by one or more processors, cause the one or more processors to perform:

monitoring packets received from an internetworked system, wherein the packets are received on one of a plurality of external interfaces of a networking device;

detecting that a received packet includes real-time information that signals a present or pending congestion condition on a path from the external interfaces of the networking device to the internetworked system;

wherein the present or pending congestion condition is experienced by a first traffic flow of data packets from the external interfaces of the networking device to the internetworked device;

notifying a control logic of the real-time information;

receiving from the control logic control information defining a change in one or more paths from the external interfaces to the internetworked system;

wherein the change in the one or more paths addresses said present or pending congestion condition;

wherein the change diverts traffic of one or more other traffic flows of data packets to other paths that are different from the path;

wherein the change maintains the path for the first traffic flow of data packets; and changing the one or more paths from the external interfaces to the internetworked system.

12. An apparatus, comprising:

one or more processors; and a network interface communicatively coupled to the one or more processors and configured to communicate one or more packet flows among the one or more processors in a network; and a computer readable medium comprising one or more sequences of instructions which, when executed by one or more processors, cause the one or more processors to perform:

monitoring packets received from an internetworked system, wherein the packets are received on one of a plurality of external interfaces of a networking device;

detecting that a received packet includes real-time information that signals a present or pending congestion condition on a path from the external interfaces of the networking device to the internetworked system;

wherein the present or pending congestion condition is experienced by a first traffic flow of data packets from the external interfaces of the networking device to the internetworked device;

notifying a control logic of the real-time information;

receiving from the control logic control information defining a change in one or more paths from the external interfaces to the internetworked system;

wherein the change in the one or more paths addresses said present or pending congestion condition;

wherein the change diverts traffic of one or more other traffic flows of data packets to other paths that are different from the path;

wherein the change maintains the path for the first traffic flow of data packets; and changing the one or more paths from the external interfaces to the internetworked system.

13. An apparatus as claimed in claim 12, wherein the one or more sequences of instructions further comprise instructions which, when executed by one or more processors, cause the one or more processors to perform sending one or more packets from the networking device to an internetworked system, wherein the one or more packets are in a format that is markable by intermediary networking devices to signal a present or pending congestion condition.

14. An apparatus as claimed in claim 12, wherein the received packet is a Transmission Control Protocol packet having a Explicit Congestion Notification Echo flag is set.

15. An apparatus as claimed in claim 12, wherein the instructions for monitoring comprise instructions for classifying packets from the internetworked system into traffic flows identified by attributes in the packets.

16. An apparatus as claimed in claim 15, wherein one of the attributes identifying traffic flows is a prefix associated with an host in the internetworked system.

17. An apparatus as claimed in claim 15, wherein one of the attributes identifying traffic flows is a prefix associated with an host in an internetworked system of which the networking device is a part.

18. An apparatus as claimed in claim 15, wherein one or more attributes of the attributes identifying traffic flows also identify an application.

19. An apparatus as claimed in claim 12, wherein the instructions for notifying comprise instructions for sending, to the control logic, probing information about delay, jitter, packet loss, and corrupted packets on one or more paths between the networking device and the internetworked system.

20. An apparatus as claimed in claim 12, wherein the one or more sequences of instructions further comprise instructions which, when executed by one or more processors, cause the one or more processors to perform receiving from the control logic control information defining a change in one or more routing policies in the networking device, wherein the one or more routing policies are to be complied by the networking device when the networking device exchanges route information with other networking devices; and changing the one or more routing policies on the networking device.

21. An apparatus as claimed in claim 12, wherein the one or more sequences of instructions further comprise instructions which, when executed by one or more processors, cause the one or more processors to perform receiving from the control logic control information defining a change in one or more forwarding policies in the networking device, wherein the one or more forwarding policies are to be complied by the networking device when the networking device forwards packets; and changing the one or more forwarding policies on the networking device.

22. An apparatus, comprising:
means for monitoring packets received from an internetworked system, wherein the packets are received on one of a plurality of external interfaces of a networking device;
means for detecting that a received packet includes real-time information that signals a present or pending congestion condition on a path from the external interfaces of the networking device to the internetworked system;
wherein the present or pending congestion condition is experienced by a first traffic flow of data packets from the external interfaces of the networking device to the internetworked device;
means for notifying a control logic of the real-time information;
means for receiving from the control logic control information defining a change in one or more paths from the external interfaces to the internetworked system;
wherein the change in the one or more paths addresses said present or pending congestion condition;
wherein the change diverts traffic of one or more other traffic flows of data packets to other paths that are different from the path;
wherein the change maintains the path for the first traffic flow of data packets; and
means for changing the one or more paths from the external interfaces to the internetworked system.

23. An apparatus as claimed in claim 22, further comprising sending one or more packets from the networking device to an internetworked system, wherein the one or more packets are in a format that is markable by intermediary networking devices to signal a present or pending congestion condition.

24. An apparatus as claimed in claim 22, wherein the received packet is a Transmission Control Protocol packet having a Explicit Congestion Notification Echo flag is set.

25. An apparatus as claimed in claim 22, wherein means for monitoring comprises means for classifying packets from the internetworked system into traffic flows identified by attributes in the packets.

26. An apparatus as claimed in claim 22, wherein one of the attributes identifying traffic flows is a prefix associated with an host in the internetworked system.

* * * * *

UNITED STATES PATENT AND TRADEMARK OFFICE
CERTIFICATE OF CORRECTION

PATENT NO. : 7,606,159 B2  Page 1 of 1
APPLICATION NO. : 11/216589
DATED : October 20, 2009
INVENTOR(S) : Dalal et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 789 days.

Signed and Sealed this

Fifth Day of October, 2010

David J. Kappos
*Director of the United States Patent and Trademark Office*